(No Model.)
W. C. BURTCH & E. M. GURNEE.
ANTI FRICTION BEARING.
No. 408,950. Patented Aug. 13, 1889.
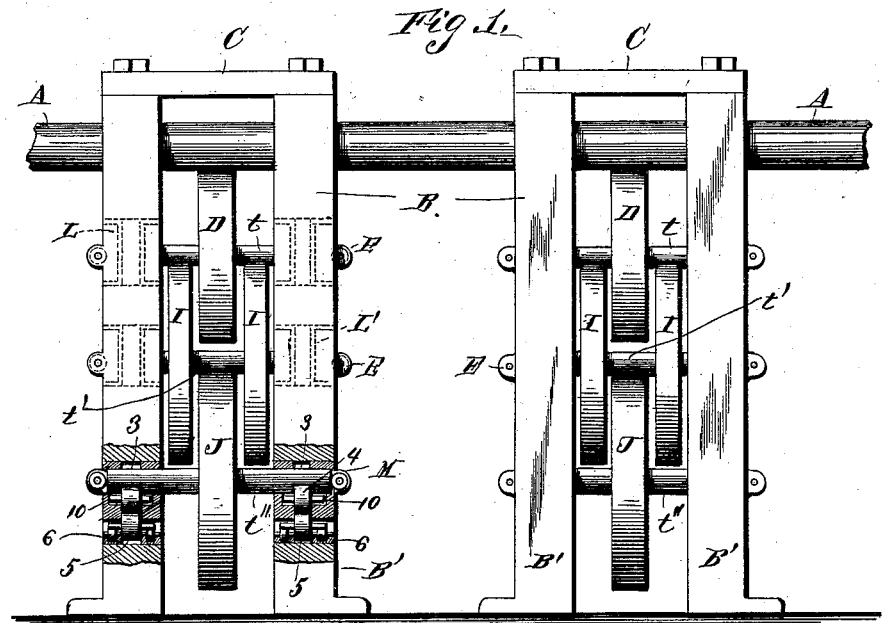
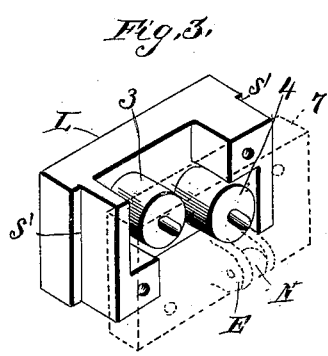
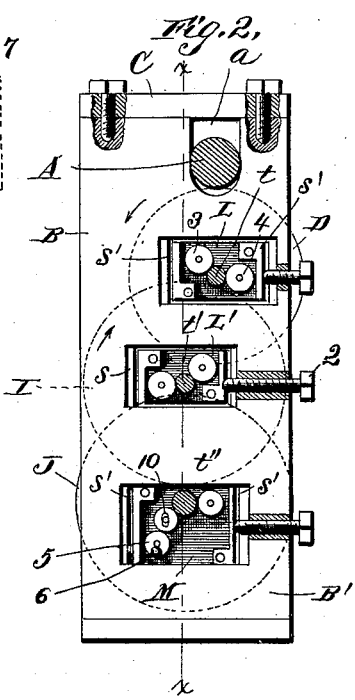
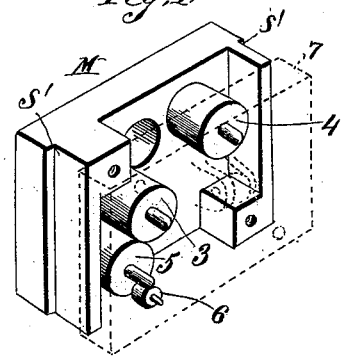
WITNESSES
C. L. Taylor
H. C. Johnson
INVENTORS
W. C. Burtch,
E. M. Gurnee,
By J. C. Higdon
their Attorney.

UNITED STATES PATENT OFFICE.

WILLIAM C. BURTCH AND ELBERT M. GURNEE, OF KANSAS CITY, MISSOURI, ASSIGNORS OF ONE-TENTH TO FRANK RIDGEWAY, OF SAME PLACE.

ANTI-FRICTION BEARING.

SPECIFICATION forming part of Letters Patent No. 408,950, dated August 13, 1889.

Application filed May 14, 1889. Serial No. 310,714. (No model.)

*To all whom it may concern:*

Be it known that we, WILLIAM C. BURTCH and ELBERT M. GURNEE, of Kansas City, Jackson county, Missouri, have invented certain new and useful Improvements in Anti-Frictional Bearings for Shafting, Journals, &c., of which the following is a full, clear, and exact description, reference being had to the accompanying drawings, forming a part hereof.

This invention relates to certain improvements in shaft or journal bearings; and it consists of the novel combination of parts and their construction, as will fully appear from the following description and illustrations, in which—

Figure 1 is an edge view of two of our improved anti-frictional bearings with a shaft supported in position by them, small portions of one of the bearings being broken away and shown in section. Fig. 2 is a side view of one bearing. Fig. 3 is a detail perspective view of one of the upper anti-frictional boxes removed from the main frame of the bearing. Fig. 4 is a similar view of one of the lower anti-frictional boxes, also having one side removed and being detached from the main frame; and Fig. 5 is a detail end view showing in particular an anti-frictional roller as applied to the ends of the shafts which make up the bearing.

A represents a suitable shaft. It may be a line-shafting, car-axle, or the shaft of any suitable machine or mechanism which it is desired to run with the least amount of friction.

B is the main frame of the bearing, consisting of parallel side pieces B', looped or connected together at their upper ends by a yoke or cross-piece C. The lower or inner ends of these side pieces are preferably provided with flanges or feet which may rest upon the floor of the building in which the bearing is located, or which may be secured to suitable supports by means of bolts or other fastening devices. Said pieces are provided at their upper ends with a suitable slot $a$, for the passage of the shaft or journal A, which is to be supported. In the frame thus formed are arranged the main carrying-wheel D, the intermediate wheels I I, and the lower wheel J. The shaft $t$ of the carrying-sheave D rests upon the periphery of the wheels I I in a position which is out of alignment with or a little to one side of a vertical line passing through the shaft $t'$ of said wheels I I. (See the line $x\ x$, Fig. 2.)

The shaft $t'$ of the wheels I I rests upon the periphery of the lower wheel J, the entire superposed weight of the upper wheel and the wheels I I, including their adjunctive parts, and the weight of shaft A thus being transferred to and supported by the bottom wheel, while by journaling the main wheel D on a line a little to one side of the shafts of wheels I I, next below, as aforesaid, we have found that friction is greatly diminished and motion is more readily imparted to the wheel D than if its shaft were in perfect alignment with the shaft of wheels I I.

The wheel D and wheels I I and J are of varying diameter, as shown, the diameter of said wheel D being considerably less than the diameters of said wheels I I and J, or the diameter of the said wheel D is preferably a little less than the diameter of the lower wheel. The said shafts $t$, $t'$, and $t''$ of the wheel D and wheels I I and J, respectively, are supported or journaled upon the anti-frictional rolls 3 and 4 at each end, the sets of rolls of said shafts being journaled in the loosely-held and removable boxes L, L', and M, respectively, which are disposed in the side pieces B'. Said rolls 3 and 4 of the boxes L L' bear upon the sides of the shafts $t\ t'$ in a horizontal line with their centers and a little above their centers, respectively, said rolls, however, being reversed side for side in these boxes.

In the lowermost boxes M the arrangement of the rolls 3 and 4 is similar to that of the rolls in the boxes L L', except that the rolls 3 have their shafts loosely bearing in chambers 10, which are formed in said side pieces, and said rolls 3 are arranged to bear under upon the shaft $t\ t''$. In these boxes M are arranged additional rolls 5, whose shafts also rest in chambers similar to 10 and upon smaller anti-frictional rolls 6, the shafts of which latter are journaled in supplemental chambers or bearings.

Hung in brackets or bearings E, extending outward from the side pieces of the frame, are anti-frictional rolls N, which rest against the ends of the several shafts $t\ t'\ t''$, and thus prevent endwise movement or displacement of said shafts.

The boxes L, L', and M are held in place in the frame by means of suitable set-screws 2, threaded into the side pieces and projecting through their rear edges into engagement with the rear end of said boxes. The holding action of these screws upon the boxes, however, is not sufficient to prevent the latter from having a slight vertical play, their containing slots or openings in the frame in which they are mounted being of greater depth than the said boxes, whereby such vertical movement is permitted; but we do not permit the lowermost boxes M to have a vertical movement, the same wholly occupying or fitting their containing slots in depth. This is for the purpose of sustaining the whole of the weight of the superposed parts, as above set forth, upon the lowermost wheel J and through its shaft $t''$ upon the lowermost boxes. Said boxes L, L', and M have in their end walls grooves $s'$, the front ends of which receive guides or plates $s$ in their containing-slots, while the inner ends of the set-screws 2 are received in the rear grooves to properly hold the boxes in position with relation to the side pieces of the frame. The function of the said plates or guides is to maintain the boxes in vertical position.

Having thus described our invention, what we claim is—

1. The anti-friction bearing comprising the side pieces having the rectangular recesses, the boxes in said recesses having the vertical grooves at their ends and carrying the anti-friction rolls, the shafts $t\ t'\ t''$, supported on said anti-friction rolls and having the anti-friction wheels D I J, respectively, the guides or plates $s$ in the vertical grooves at one end of the boxes and fitting in one end of the recesses, and the set-screws in the side pieces and having their inner ends bearing in the grooves of the boxes at the ends opposite the said plates $s$, substantially as described.

2. In a shaft or journal bearing, the supporting-frame having boxes containing anti-frictional rolls and which boxes are held between a guide fitting in a groove at one end and by a set-screw bearing in a groove at the opposite end of the box, substantially as specified.

3. The improved shaft or journal bearing consisting of a frame having boxes containing anti-frictional rolls and anti-frictional wheels, said boxes also having anti-frictional rolls resting against the ends of the shafts of said wheels, substantially as specified.

4. In a shaft or journal bearing, the supporting-frame having a series of anti-frictional wheels, and slots or passages for the main shaft, and a series of journal-boxes supporting the shafts of said wheels, the shaft of the uppermost wheel resting upon the pheripheries of the wheels next below, but at a point in rear of the shaft of the latter wheels, substantially as specified.

In testimony whereof we affix our signatures in presence of two witnesses.

WILLIAM C. BURTCH.
ELBERT M. GURNEE.

Witnesses:
F. G. FISCHER,
A. A. HIGDON.